United States Patent
Binas et al.

(10) Patent No.: US 11,270,199 B2
(45) Date of Patent: Mar. 8, 2022

(54) ANALOGUE ELECTRONIC NEURAL NETWORK

(71) Applicant: UNIVERSITÄT ZÜRICH, Zurich (CH)

(72) Inventors: Jonathan Jakob Moses Binas, Montreal (CA); Daniel Lawrence Neil, Brooklyn, NY (US)

(73) Assignee: UNIVERSITÄT ZÜRICH, Zurich (CH)

( * ) Notice: Subject to any disclaimer, the term of this patent is extended or adjusted under 35 U.S.C. 154(b) by 869 days.

(21) Appl. No.: 16/078,769

(22) PCT Filed: Feb. 17, 2017

(86) PCT No.: PCT/EP2017/053678
§ 371 (c)(1),
(2) Date: Aug. 22, 2018

(87) PCT Pub. No.: WO2017/144372
PCT Pub. Date: Aug. 31, 2017

(65) Prior Publication Data
US 2019/0050720 A1    Feb. 14, 2019

(30) Foreign Application Priority Data
Feb. 22, 2016  (EP) .................... 16156629

(51) Int. Cl.
*G06N 3/063*  (2006.01)
*G06N 3/08*   (2006.01)
*G06N 3/04*   (2006.01)

(52) U.S. Cl.
CPC ............ *G06N 3/0635* (2013.01); *G06N 3/04* (2013.01); *G06N 3/08* (2013.01)

(58) Field of Classification Search
CPC .......... G06N 3/06; G06N 3/0635; G06N 3/08; G06N 3/04
See application file for complete search history.

(56) References Cited

U.S. PATENT DOCUMENTS 5,247,606 A   9/1993   Tam
6,501,294 B2  12/2002  Bernstein et al.
(Continued)

FOREIGN PATENT DOCUMENTS

CN   103455843 A   12/2013
CN   105224986 A   1/2016
(Continued)

OTHER PUBLICATIONS

JP Notice of Allowance in application No. 2018-562704 dated Jan. 9, 2020.
(Continued)

*Primary Examiner* — Benjamin P Geib
(74) *Attorney, Agent, or Firm* — Maschoff Brennan

(57) ABSTRACT

The present invention concerns a method of programming an analogue electronic neural network comprising a plurality of layers of somas. Any two consecutive layers of somas are connected by a matrix of synapses. The method comprises: applying test signals to inputs of the neural network; measuring at a plurality of measurement locations in the neural network responses of at least some somas and synapses to the test signals; extracting from the neural network, based on the responses, a first parameter set characterising the behaviour of the at least some somas; carrying out a training of the neural network by applying to a training algorithm the first parameter set and training data for obtaining a second parameter set; and programming the neural network by using the second parameter set. The invention also relates to the neural network and to a method of operating it.

14 Claims, 3 Drawing Sheets

(56) References Cited

U.S. PATENT DOCUMENTS

| | | | | |
|---|---|---|---|---|
| 8,694,452 | B2* | 4/2014 | Aparin | G06N 3/049 |
| | | | | 706/38 |
| 2009/0228416 | A1 | 9/2009 | Nugent | |
| 2012/0011088 | A1 | 1/2012 | Aparin et al. | |
| 2012/0011090 | A1 | 1/2012 | Tang et al. | |
| 2017/0243108 | A1* | 8/2017 | Ritter | G06N 3/049 |

FOREIGN PATENT DOCUMENTS

| | | |
|---|---|---|
| KR | 10-2013-0026213 A | 3/2013 |
| KR | 10-2013-0036318 A | 4/2013 |
| KR | 10-2013-0036325 A | 4/2013 |
| WO | 2013/108299 A1 | 7/2013 |

OTHER PUBLICATIONS

EP Office Action in application No. 17 704 800.6 dated Oct. 22, 2019.

Orgenci, A.S., et al., "Fault-tolerant training of neural networks in the presence of MOS transistor mismatches," IEEE Transactions on Circuits and Systems II: Analog and Digital Signal Processing, vol. 48, No. 3, pp. 272-281 (Mar. 2001).

Binas, J., et al., "Precise deep neural network computation on imprecise low-power analog hardware," Neural and Evolutionary Computing, pp. 1-21 (Jun. 23, 2016).

Chicca, E., et al., "Neuromorphic Electronic Circuits for Building Autonomous Cognitive Systems," in Proceedings of the IEEE, vol. 102, No. 9, pp. 1367-1388 (Sep. 2014).

Gothoskar, G., et al., "Piecewise-linear modeling of analog circuits based on model extraction from trained neural networks," Proceedings of the 2002 IEEE International Workshop on Behavioral Modeling and Simulation, BMAS 2002, pp. 41-46 (Oct. 6, 2002).

Indiveri, G., "Current Mode Subthreshold Analog MOS Components for Neuromorphic Processing," Technical Report, Jan. 4, 1994, Retrieved from the Internet: URL:http://ncs.ethz.ch/pubs/pdf/Indiveri94.pdf.

Liu, B., et al., "Vortex: Variation-aware Training for Memristor X-bar," 52nd ACM/EDAC/IEEE Design Automation Conference (DAC), pp. 1-6 (Jun. 8, 2015).

Mundie, D.B. and Massengill, L.W., "A simulation and training technique for analog neural network implementations," Proceedings of 1994 IEEE International Conference on Neural Networks (ICNN'94), vol. 3, pp. 1975-1980 (Jun. 27, 1994).

CN Office Action in Application No. 201780011612.2 dated May 31, 2021.

Sina Balkir et al., "Fault-Tolerant Training of Neural Networks in the Presence of MOS Transitor Mismatches", IEEE Transactions on Circuits and Systems, 48, 3, Mar. 31, 2001.

Jonathan Binas et al., "Precise deep neural network computation on imprecise low-power analog hardware", arXiv:1606.07786v120160623, [cs.NE], Jun. 23, 2016.

KR Notice of Allowance in Application No. 10-2020-084627814 dated Dec. 2, 2020.

* cited by examiner

ANALOGUE ELECTRONIC NEURAL NETWORK

TECHNICAL FIELD

The present invention relates to a method of programming an analogue electronic neural network. The invention also relates to the analogue electronic neural network and to a method of operating the analogue electronic neural network.

BACKGROUND OF THE INVENTION

Over the past years, deep neural networks have evolved to become the method of choice for many computer vision, speech recognition and data analysis tasks, often outperforming previously known methods and enabling breakthroughs in numerous fields. Deep neural networks typically comprise more than three hidden neuron layers; a hidden layer is a layer other than the input layer and the output layer. Correspondingly, efficient methods of computing using these deep networks have been explored at both the algorithmic and hardware level. The mathematical operations required for implementing these neural networks may be realised in digital logic or using analogue circuit elements. In contrast to digital systems, analogue systems use currents and voltages to represent numeric values which are part of the computation, allowing particular operations to be achieved with simpler circuits than in digital systems and potentially leading to advantages in speed and power consumption. However, as currents and voltages carry actual values, the physical properties of a device have an impact on the computation, and the variability inherent in microchip fabrication processes can lead to significant functional differences between individual devices. This means that no two analogue electronic devices behave exactly the same, and they may therefore struggle to meet precision and reliability requirements.

Neural networks typically process analogue input signals and are programmed to perform a given task through an extensive training process. Analogue circuits implementing neural networks have been proposed before, however, their potential has never been realised due to lack of advanced tools and training techniques, after digital neural network architectures had already become dominant. Analogue deep neural networks are significantly more sensitive to fabrication imperfections than digital neural networks. Furthermore, known analogue neural networks suffer from high power consumption when clocked at high frequencies, and it has therefore not been possible to run large deep neural networks in real-time on battery powered devices.

There is thus a need for a fast and power-efficient analogue electronic neural network, a method of operating it and a more advanced method for programming that kind of network.

SUMMARY OF THE INVENTION

According to a first aspect of the invention, there is provided a method of programming an analogue electronic neural network as recited in claim 1.

Using this method, it is possible to take into consideration manufacturing imperfections or other variations in the neural networks and thus program each fabricated neural network individually so that each programmed network can then be operated in an optimum manner.

According to a second aspect of the invention, there is provided an analogue electronic neural network as recited in claim 11.

According to a third aspect of the invention, there is provided a method of operating the analogue electronic neural network according to the second aspect.

The proposed analogue electronic neural network, when programmed properly, may achieve state-of-the-art performance while dissipating significantly less power than most efficient digital electronic neural networks. The very low power consumption can be achieved by running at least some components of the network in their sub-threshold (weak inversion) region.

Other aspects of the invention are recited in the dependent claims attached hereto.

BRIEF DESCRIPTION OF THE DRAWINGS

Other features and advantages of the invention will become apparent from the following description of a non-limiting exemplary embodiment, with reference to the appended drawings, in which.

DETAILED DESCRIPTION OF AN EMBODIMENT OF THE INVENTION

Figure 1:
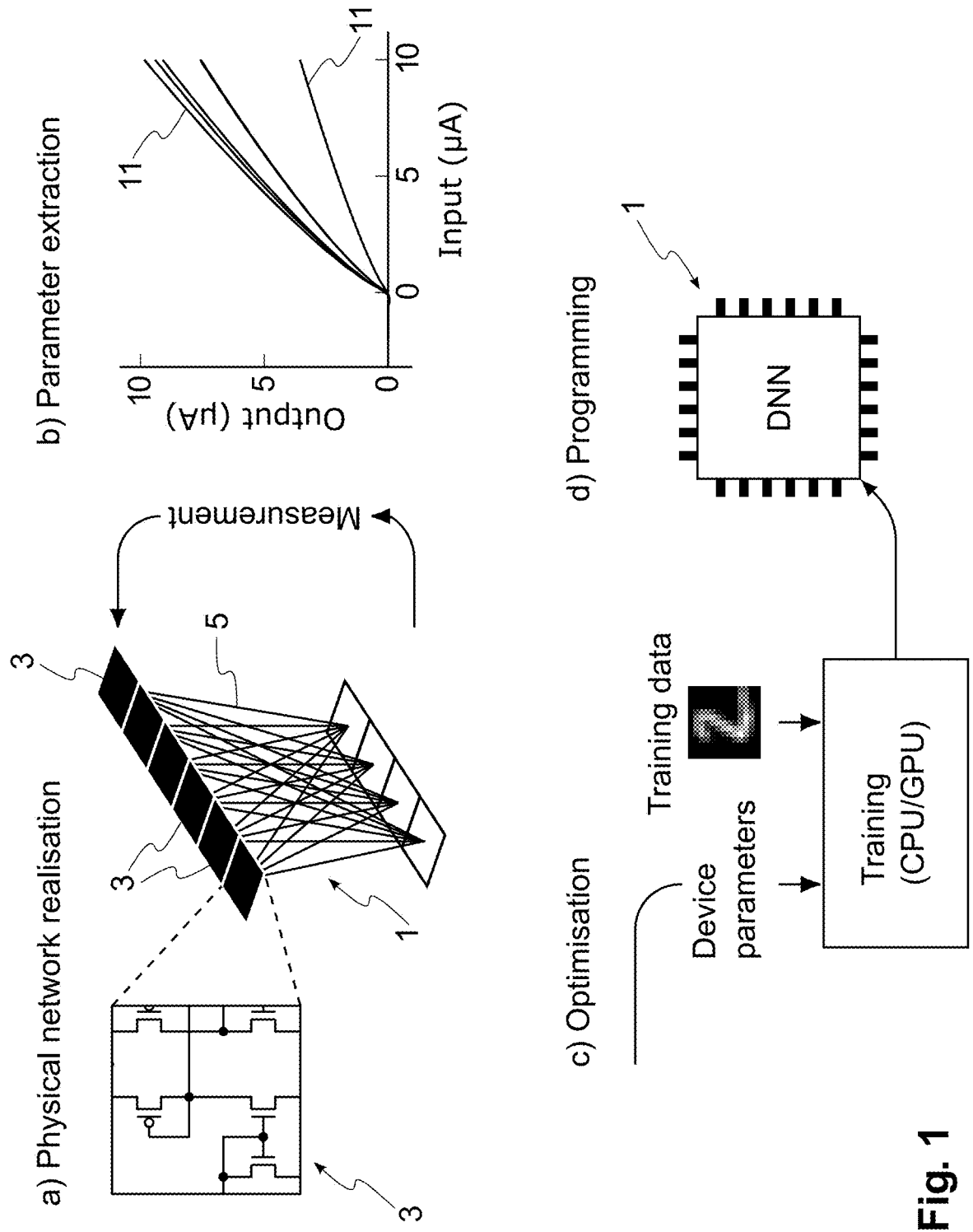
FIG. 1 is a diagram illustrating an example method of programming an analogue electronic neural network according to the present invention.

An embodiment of the present invention will now be described in detail with reference to the attached figures. Identical or corresponding functional and structural elements which appear in different drawings are assigned the same reference numerals.

Deep neural networks consist of multiple layers of neurons, also referred to as somas, somata or cells, implementing a summation of their inputs followed by a non-linearity function, such as a sigmoid or a rectification function. The somas are connected through weighted links that perform a scalar multiplication before passing the output of one soma to the next. Thus, the output of one soma i is given by $x_i = f(\Sigma_j w_{ij} x_j)$, where $f$ is the non-linearity, and $w_{ij}$ is the weight of the connection from soma j to soma i.

The described example embodiment is illustrated by means of fully connected feed-forward networks that are trained through stochastic gradient descent using the back-propagation algorithm, which is currently the most common and most effective way of training deep networks. A fully connected feed-forward network is one in which information always moves in one direction (i.e. it never travels backwards through the network), and where one soma from one layer is connected to all somas of the following layer. However, the present invention is not limited to this case, and can be applied to other network architectures (e.g. convolutional networks), as well as in conjunction with more sophisticated gradient descent methods. It is also possible to apply the teachings of the present invention to partially and/or recurrently connected neural networks.

Summation, multiplication and non-linear transformation operations can all be implemented efficiently in analogue electronic circuits, i.e. with few transistors. In these circuits, numerical values are represented by real voltage or current values, rather than being encoded digitally. While digital systems are insensitive to noise and small variations by interpreting every value as either 0 or 1, the performance of analogue systems is affected by fabrication mismatch—small fluctuations in the fabrication process that lead to slightly different characteristics across devices and across different elements on the same device—and various sources of noise. As a consequence, the operations defining a soma become soma-dependent, such that $x_i = \hat{f}_i(\Sigma_j w_{ij} x_j)$, where $\hat{f}_i$ approximately corresponds to $f$ but is slightly different for every soma i. Note that deviations in the summation operation can be expressed as part of $\hat{f}$ and deviations of the weights $w_{ij}$ are ignored here.

Typically, neural networks are configured for a particular task through a training process, optimising their input-output relation to approximate a given training dataset. The back-propagation algorithm is a two-stepped, supervised training method, consisting of a forward pass, in which the input stimulus is passed successively through all layers, and a backward pass, in which the output error of the network is computed and successively passed backwards through the layers. Thereby, as a consequence of the chain rule, the error gradients used to update the network parameters (weights) can be computed layer-wise and must not be computed for the whole network at once, dramatically simplifying the training process. In order for this to work, the transfer function $f$ needs to be differentiable (in practice, piece-wise differentiability is sufficient, as is the case for the often used rectified linear transfer function). Traditionally, neural networks have been implemented in digital general-purpose hardware using central processing units (CPUs) and graphics processing units (GPUs), using the same transfer function $f$ for all somas. If, however, the transfer characteristics $\hat{f}_i$ of the different somas of an analogue electronic neural network implementation are known, the network can be trained based on such heterogeneous transfer characteristics to obtain a network configuration that implements the desired task in the corresponding analogue electronic system.

Figure 2:
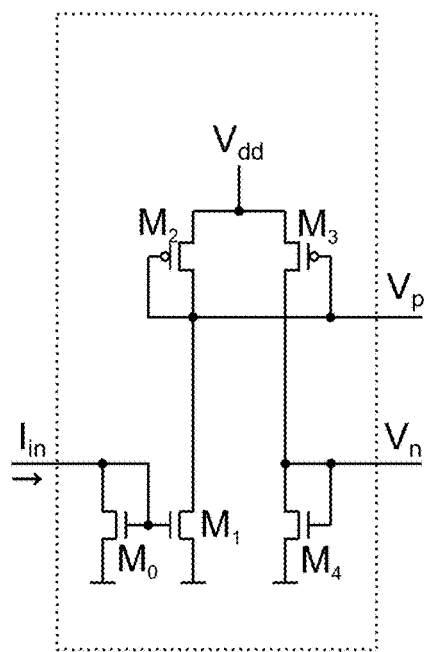
FIG. 2 is a schematic circuit representation of an example soma circuit according to the present invention.
Figure 3:
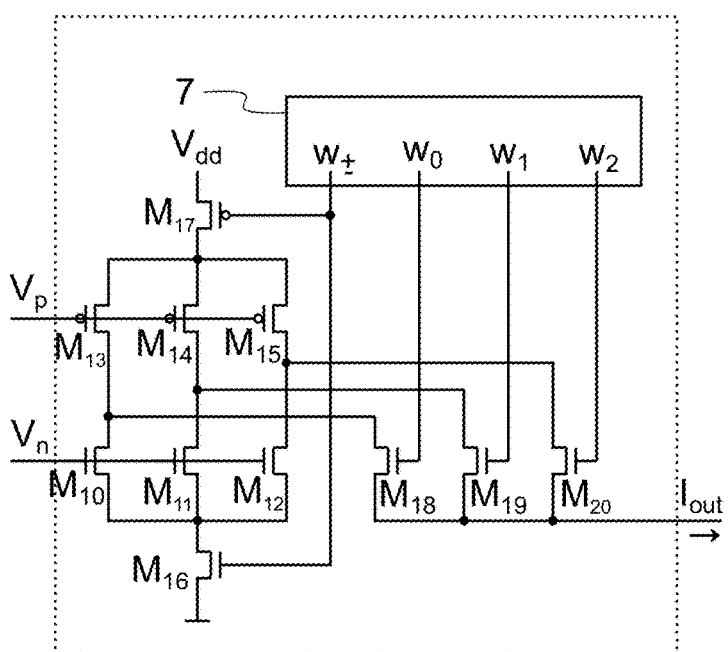
FIG. 3 is a schematic circuit representation of an example synapse circuit according to the present invention.

The process of implementing a target functionality in such a heterogeneous neural network is illustrated in FIG. 1. In step a) a general, programmable neural network 1 (i.e. with changeable weights) is implemented physically on a substrate by means of analogue circuits as shown in FIGS. 2 and 3, together with memory elements that store the weight configuration (shown in FIG. 3). In step b) the transfer characteristics or more generally a first parameter set of the different somas 3 can be extracted through measurements by applying certain input patterns, as explained later in more detail, configuring the connectivity in certain ways, and recording the activation of the different somas 3. In other words, by providing varying inputs to the network 1 and changing the weight configuration of synapses 5 while measuring the activation of somas 3 in the different layers, the individual, potentially mismatched transfer functions of those somas can be reconstructed. In this manner the responses of individual somas 3 are measured for obtaining the first parameter set describing the individual soma responses. Thus the individual somas are modelled based on corresponding measurements of the individual somas.

Accordingly, the first parameter set may comprise or consist of values which are non-averaged and/or which are not based on variance and/or which are not processed in another manner. If the transfer characteristic curves are sufficiently simple (depending on the actual circuit used), continuous, piece-wise differentiable functions can be fitted to the discrete measurements (see FIG. 6) and the fitting parameters be used to describe the device characteristics. Alternatively, some interpolation scheme (e.g. linear) can be used to describe the curves. In other words, the transfer functions can be approximated by substantially linear curves or partly linear curves, which may consist of at least two linear curves, for example. The continuous curve description can now be used in step c) by the training algorithm, which is run on traditional hardware, to compute virtual activations and their derivatives, leading to a network configuration tailored to the particular physical network device that has been characterised. In other words, the mismatched transfer characteristics are included in the training, thereby allowing optimisation of the network 1 for the particular device (neural network) which has been measured. In step d), the parameters, also referred to as a second parameter set, found by the training algorithm are mapped back to the network 1 to implement a network whose performance is comparable to the non-mismatched theoretical ideal. It is to be noted that the first parameter set and the second parameter set may not comprise the same types of parameters. The first parameter set may be composed of measurements that characterise the physical hardware, while the second parameter set may comprise weights that set the hardware to carry out a particular task.

Figure 4:
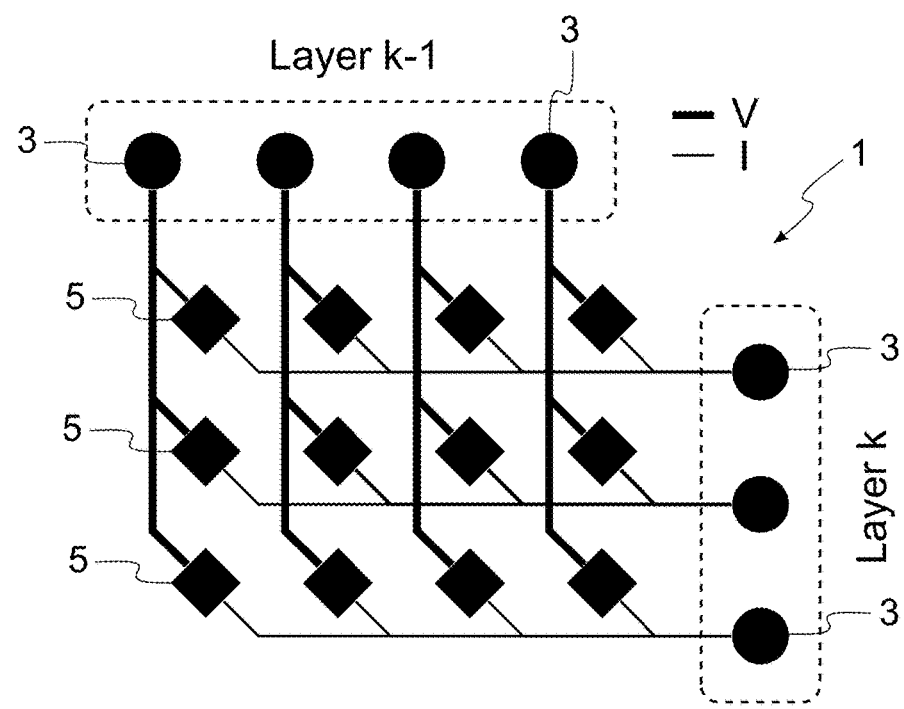
FIG. 4 is a schematic diagram of two soma layers connected by a matrix of synapses.

The proposed method and the proposed analogue deep neural network 1 are next explained in more detail with reference to an example feed-forward network implementation based on the soma and synapse circuits shown in FIGS. 2 and 3 respectively. In other words, a multilayer neural network 1 is created from current-mode analogue circuits of FIGS. 2 and 3. The term current-mode refers to circuits that use both currents and voltages (like every electronic circuit) but where signals are represented as currents, and voltages play only an incidental role. A part of the neural network 1 is schematically illustrated in FIG. 4 showing two consecutive layers of somas 3 connected by a matrix of the synapses 5. A network is thus constructed by connecting layers of soma circuits through matrices of programmable synapse circuits. Using the circuits shown in FIGS. 2 and 3, the output of a soma circuit 3 is communicated or encoded as a voltage (thick line in FIG. 4) and passed to a column of synapse circuits 5, implementing multiplications by scalars. The output of a synapse 5, in turn, is a current (thin line in FIG. 4), such that the outputs of a row of synapses 5 can be summed by simply connecting them through wires and no additional transistors are required. The summed current is then passed as input to a soma of the next layer, which implements the non-linearity.

The soma circuit 3 takes a current as input and essentially performs a rectification (non-linear function), similar to the 'ReLU' transfer function commonly used in software-implemented deep networks, and provides as output a voltage that is proportional to the log-transformed, rectified input current. However, it is to be noted that with an appropriate transformation, input voltages could be used instead of currents. The synapse circuit 5 performs an exponentiation of its input, such that its output is roughly linear in the input to the soma 3. Multiplication in the synapse 5 is carried out via scaling current mirrors, whereby the multiplication factor is proportional to the width of the respective transistors used. As explained later in more detail, in the proposed example implementation, signed 3-bit synapses 5 are used, which are based on 2×3 current mirrors of different dimensions (3 for positive and 3 for negative values). One of $2^4$ possible weight values of a synapse is then implemented by switching on or off the respective current mirrors. The weight configuration of an individual synapse 5 can thereby be stored digitally in a memory element 7, which is part of the actual synapse circuit 5. Thus, the proposed circuit computes 'in memory' and does not rely on expensive shuffling of data between memory and processing elements.

The network 1 may be run in the sub-threshold regime to achieve extraordinary power characteristics. The sub-threshold (weak inversion) current of a transistor is exponential in the gate voltage, rather than polynomial as is the case in above threshold operation, and can span many orders of magnitude, such that a system based on this technology can be run at orders of magnitude lower currents than a digital one. In other words, in the sub-threshold region of operation, voltage and current follow the log and exponential relationship. In turn, due to the exponential voltage-current relation, the device mismatch can have a significantly greater impact, explaining to some extent why this technology is not commonly used. By incorporating the mismatch as a parameter in the optimisation rather than controlling it, these limitations are circumvented. Thus, in the present invention, constraints such as the physical parameters of a specific device, are used to guide the network optimisation process. The sub-threshold operation can be achieved by applying a low network input current $I_{in}$ and/or a low voltage from a voltage source $V_{dd}$.

In the neural network 1, both currents and voltages may be used to transmit information: as shown in FIG. 2, the soma circuit 3 takes an input current $I_{in}$ and produces a set of output voltages $V_n$, $V_p$ (i.e. a first voltage and a second voltage, which may have the same value), which is passed to all outgoing synapses 5. The synapse circuits 5, in turn, produce an output current $I_{out}$ as shown in FIG. 3. As explained above, the summation of outputs of different synapses 5 may be done by simply connecting them together. The summed current is then passed as input to the soma 3 of the next layer, which implements the non-linearity. The binary weight and sign of the synapse 5 is set by configuration bits $w_\pm$, $w_i$ (the example circuit depicted presents a signed 3-bit synapse), whereby the actual values of the different possible weights are determined by the size of the transistors used. The soma circuit 3 performs the rectification and, depending on the input current, a non-linear compression of the input current. The non-linear compression would happen if a high input current is applied to the soma 3, or if the voltage $V_{dd}$ is low. The resulting current is then copied to the synapse circuit 5, where it is multiplied by a scalar proportional to the sizes of the respective transistors.

Referring to FIG. 2, with a transistor $M_0$ as a diode-connected n-type field-effect transistor (nFET), the soma 3 essentially performs a rectification of the input current $I_{in}$. Further, the current is copied to transistor $M_1$ and, through transistors $M_2$ and $M_3$, also to a transistor $M_4$. Transistors $M_0$ and $M_1$ can be considered to form a first current mirror, while transistors $M_2$ and $M_3$ form a second current mirror. Transistor $M_2$ together with p-type field-effect transistors (pFETs) from the connected synapse circuits 5 form a first scaling current mirror or more specifically a first set of current mirrors ($M_2$ forming with every pFET a current mirror), while transistor $M_4$ together with nFETs from the connected synapse circuits 5 form a second scaling current mirror, or more specifically a second set of current mirrors ($M_4$ forming with every nFET a current mirror), generating scaled copies of the rectified input current $I_{in}$ so that the first scaling current mirror produces a positive current, while the second scaling current mirror produces a negative current. These currents may have the same amplitude. The scaling factor is thereby determined by the dimensions of $M_{10}$ to $M_{15}$ (FIG. 3). Thus, transistors $M_0$ and $M_1$ form a current mirror, while transistors $M_2$ and $M_3$ form another current mirror. Transistors $M_0$, $M_2$ and $M_4$ are all diode-connected in this example. Transistors $M_{16}$ to $M_{20}$ operate as switches and are controlled by the digital signals (voltages) $w_\pm$, $w_0$, $w_1$, and $w_2$. The value of $w_\pm$ determines whether the positive branch (pFETs $M_{13}$ to $M_{15}$; adding current to the node $I_{out}$) or the negative branch (nFETs $M_{10}$ to $M_{12}$; subtracting current from the node $I_{out}$) is switched on and thereby the sign of the synaptic multiplication factor. Thus, only one of transistors $M_{16}$ and $M_{17}$ is on at a time. Setting $w_0$, $w_1$, and $w_2$ allows switching on or off of specific contributions to the output current $I_{out}$. In other words, with switches $M_{18}$, $M_{19}$ and $M_{20}$ it is possible to turn on or off individually any of the transistors $M_{10}$ to $M_{15}$. For example, if transistor $M_{18}$ is on, the individual contribution of $M_{13}$ would be proportional to the ratio of the widths of $M_{13}$ and $M_2$ (assuming $M_{17}$ is also on and $M_{13}$ and $M_2$ are of equal length). In the example implementation, the widths of $M_{10}$ to $M_{12}$, and $M_{13}$ to $M_{15}$ respectively, are scaled by powers of 2 (see Table 1), such that the synapse 5 would implement a multiplication by a factor approximately corresponding to the binary value of the configuration bits ($w_0$, $w_1$, $w_2$). In principle, the switches and the memory element 7 could be in one device (this could be implemented using floating gate (flash memory) or memristive devices, for instance). While the described circuit is based on a signed 3-bit version, arbitrary precision can be implemented by changing the number of multiplying transistors and corresponding switches. The dimensions of $M_3$ and $M_4$ may be adjusted such that the currents through the transistors of the positive and the negative branch of one particular bit of the synapse 5 are roughly matched when switched on. Table 1 shows transistor dimensions that are used in the present example.

TABLE 1

| Device | W (μm) | L (μm) | W/L |
|---|---|---|---|
| $M_0$ | 2.5 | 0.5 | 5 |
| $M_1$ | 2.5 | 0.5 | 5 |
| $M_2$ | 2.5 | 0.5 | 5 |
| $M_3$ | 2.5 | 0.5 | 5 |
| $M_4$ | 2 | 0.5 | 4 |
| $M_{10}$ | 0.25 | 0.5 | 0.5 |
| $M_{11}$ | 0.5 | 0.5 | 1 |
| $M_{12}$ | 1 | 0.5 | 2 |
| $M_{13}$ | 0.25 | 0.5 | 0.5 |
| $M_{14}$ | 0.5 | 0.5 | 1 |
| $M_{15}$ | 1 | 0.5 | 2 |
| $M_{16}$ | 0.5 | 0.5 | 1 |
| $M_{17}$ | 0.5 | 0.5 | 1 |
| $M_{18}$ | 0.5 | 0.5 | 1 |
| $M_{19}$ | 0.5 | 0.5 | 1 |
| $M_{20}$ | 0.5 | 0.5 | 1 |

(W = width, L = length).

The proposed simple soma and synapse circuits 3, 5 offer several advantages beyond the fact that they can be implemented in a very small circuit area. Firstly, numerical values are conveyed only through current mirrors, and are therefore temperature-independent. Secondly, most of the fabrication-induced variability is due to the devices in the soma with five consecutive transistors $M_0$ to $M_4$. This means that the synapse-induced mismatch can be neglected in a first order approximation. Very low power characteristics can be achieved by running the transistors in the sub-threshold regime, that is, by restricting currents to tens or hundreds of nA. In this example, all the transistors apart from $M_{16}$ to $M_{20}$ are run in the sub-threshold regime. It is to be noted that the described circuits are exemplary and not limiting. Particularly, other implementations of the soma circuit, taking one input current $I_{in}$, and providing two output voltages $V_p$ and $V_p$, which represent the log-transformed output of the non-linearity implemented by the soma, are possible.

Multilayer neural networks 1 can be constructed using the soma and synapse circuits 3, 5 described above by connecting layers of soma circuits 3 through matrices made up of synapse circuits 5 as already explained above. The first stage of a network constructed in this way thereby is a layer of soma circuits, rather than a weight matrix, as is typically the case in artificial neural network implementations. This is because in the proposed solution, input currents are provided rather than voltages and only soma circuits 3 take currents as inputs. As a consequence, due to the rectification, the proposed network 1 will ignore negative input signals. To obtain current outputs rather than voltages, one synapse circuit 5 is connected to each soma circuit 3 of the output layer and its weight is set to 1 to convert the output voltages to currents.

To determine the characteristic transfer curves of individual somas 3, the input-output relations of the respective soma circuits 3 need to be measured. Rather than measuring the logarithmic domain output voltages $V_n$ and $V_p$, in this example the input currents $I_{in}$ to subsequent layers are recorded. However, it would be possible to record the voltages instead and compute the corresponding currents. The advantages of the example approach are that quantities are not voltages, which are proportional to the log-transformed currents, which are the output signal of the soma circuits 3, and that potential distortions arising from the synapse circuits 5 are taken into account. Deviations induced by mismatch in the synapse circuit 5 are thereby averaged out by averaging over many synapses 5. Furthermore, with this method, only one probe is required per soma, rather than two separate ones for in- and output signals. Moreover, the unit weight of a synapse 5 (which is not known a priori) here becomes a property of the soma 3, so that weights are automatically normalised. It is to be noted, however, that the immediate output voltages of the soma circuits 3 could be measured instead of the input currents to subsequent layers, and could be used to extract the soma transfer characteristics.

Figure 5:
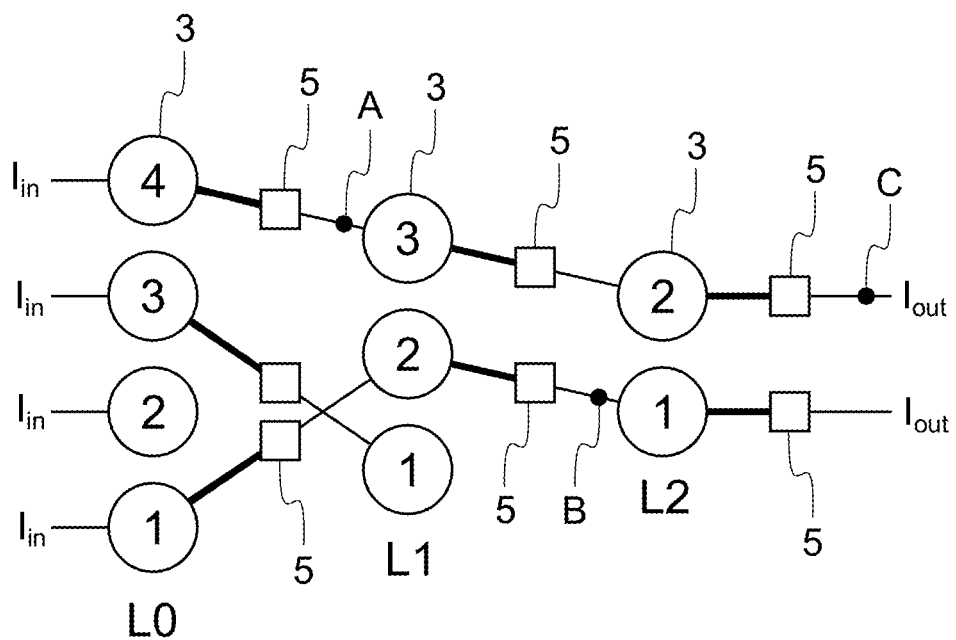
FIG. 5 is a schematic diagram of a measurement arrangement in an example analogue electronic neural network according to the present invention.

Specifically, by setting the respective synapse circuits 5 to their maximum value (i.e. maximum circuit output current) and turning off other synapse circuits 3 leading to the respective soma circuit 3, every soma 3 is configured to receive (through one synapse circuit 5) input from exactly one soma 3 of the previous layer. However, it is to be noted that it is not necessary to set the respective synapse circuits 5 to their maximum value, but any positive value would work, although the maximum value is preferred because larger transistors minimise the circuit mismatch. The diagram of FIG. 5 shows one possible weight configuration, which might arise during the parameter extraction procedure of a network with one input, one hidden, and one output layer. Circles represent soma circuits 3 and squares synapse circuits 5. Voltages are represented by thick lines, whereas currents are represented by thin lines. Only synapses 5 set to non-zero values are shown. In this example, every soma 3 receives exactly one input signal and produces, together with a connected synapse circuit 5, at maximum one output current, which can be measured as the input to the soma 3 of the following layer. However, since the currents interact linearly, it is possible to do the same process with more than one soma as an input, and instead more measurements. The input to the network is provided in terms of a set of input currents, and the output may be transformed to currents by means of an additional array of synapses 5 after the last layer. Three measurement points A, B and C are also illustrated in FIG. 5. The point A is the input of soma #3 of layer L1, while the point B is the input of soma #1 of layer L2, and the point C is the output of the whole circuit at soma #2 of layer L2.

Figure 6:
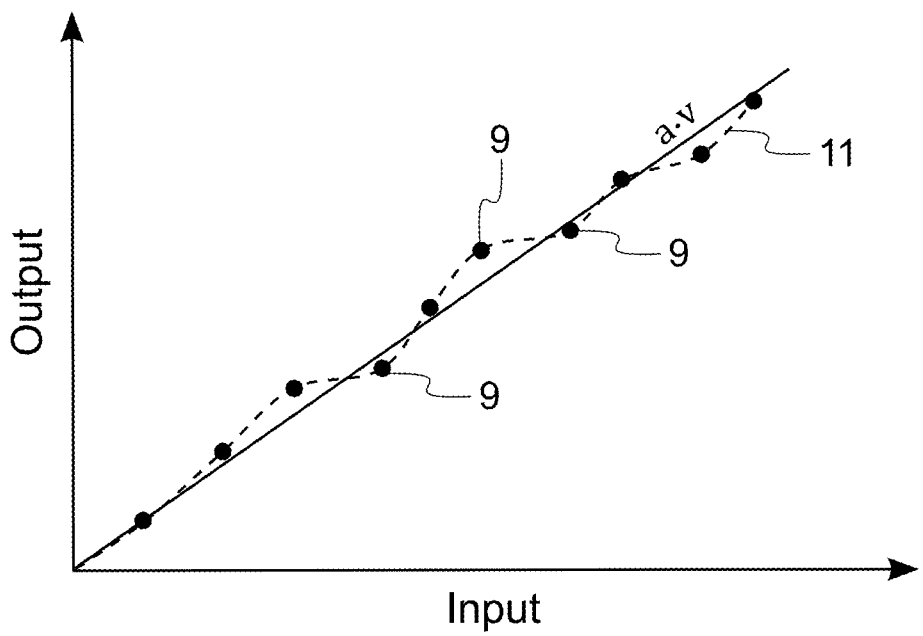
FIG. 6 is a diagram showing an example input/output relationship of a soma-synapse entity in the network of FIG. 5.

To determine the transfer curves 11 of the somas 3 in the different layers, the weight configurations of the synapses 5 may be set to a number of different configurations, and the input currents to the different somas 3 may then be measured for each of a plurality of different input patterns provided to the network 1. In this example, during a single measurement round, the input currents to all the somas 3 of the input layer are set to the same value and the inputs to the somas 3 of the deeper layers are recorded. By generating many connectivity patterns by permuting the connectivity matrix consisting of the synapse circuits 5, and setting the input currents to different values, multiple data points 9 (input-output relations) are recorded for each soma 3, such that continuous transfer curves 11 can be fitted to the data as is shown in FIG. 6 for one measurement point as an example. Rectified linear functions $f(v)=\max\{0, a \cdot v\}$ are then fitted to the data and the resulting parameters a are used as part of the training algorithm in step c) of FIG. 1.

The training of the network 1 in step c) may be carried out for example by using the stochastic gradient descent. In this example, a custom transfer function of the soma 3 consisting of the parameterised activation function $f(v)=\max\{0, a \cdot Wv\}$, using the extracted parameter a is added and used to model the soma activation function. In this example, the parameter is a gradient of a segment of the piece-wise linear function. The product-summation of the inputs Wv is not characterised; in other words the device variations in the synapse circuits 5 can be often ignored, but they can be modelled in software as a matrix multiplication. It is to be noted that in the training, other parameters than a characterising the somas 3 and/or synapses 5 could be used in addition or instead.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of programming an analogue electronic neural network comprising a plurality of layers of somas, two consecutive layers of somas being connected by a matrix of synapses, the method comprising:
   applying test signals to inputs of the analogue electronic neural network;
   measuring at least at one measurement location in the analogue electronic neural network responses of at least some somas and synapses to the test signals;
   extracting from the analogue electronic neural network, based on the responses, a first parameter set characterising the input-output relation of the at least some somas;
   carrying out a training of the analogue electronic neural network by applying to a training algorithm the first parameter set and training data for obtaining a second parameter set; and
   programming the analogue electronic neural network by using the second parameter set,
   wherein:
      the responses of individual somas are measured for obtaining the first parameter set describing individual soma responses, and
      the programming of the analogue electronic neural network comprises adjusting a weight configuration of at least some of the synapses.

2. A method according to claim 1, wherein the test signals are currents.

3. A method according to claim 1, wherein at least two of the test signals applied to the inputs at a given moment in time are equal.

4. A method according to claim 1, wherein the at least one of the measurement locations receives an input from only one soma.

5. A method according to claim 4, wherein the input is received through a synapse connected between the respective measurement location and the soma, and wherein other synapses connected to the respective measurement location are turned off.

6. A method according to claim 1, wherein the responses are outputs of transfer functions of the at least some somas.

7. A method according to claim 6, wherein the method comprises approximating at least one of the transfer functions with a linear or piece-wise linear function.

8. A method according to claim 7, wherein at least one of the parameters of the first parameter set characterises the linear or piece-wise linear function.

9. A method according to claim 1, wherein the weight configuration is adjusted by using at least one parameter of the first parameter set to derive a specific weight configuration for the analogue electronic neural network.

10. An analogue electronic neural network comprising a plurality of layers of somas, two consecutive layers of somas being connected by a matrix of synapses, wherein:
   at least some of the somas comprise a first circuit element at their input for carrying out a rectification of an input current, a first output transistor connected to a first soma output for providing a first output voltage, and a second output transistor connected to a second soma output for providing a second output voltage, the first and second soma outputs being connected to a first synapse input and to a second synapse input, respectively;
   at least some of the synapses comprise a first set of amplifiers having a common first node connected to the first synapse input, and forming with the first output transistor a first set of current mirrors for generating a scaled, positive copy of the rectified input current, and a second set of amplifiers having a common second node connected to the second synapse input, and forming with the second output transistor a second set of current mirrors for generating a scaled, negative copy of the rectified input current, the synapse further comprising a set of switches for turning on or off the first or second set of amplifiers or individual amplifiers in the first or second sets of amplifiers, and wherein the synapse further comprises a control element for controlling the set of switches, the control element comprising a memory for storing configuration bits for enabling or disabling a voltage to be applied to the set of switches for turning them on or off.

11. An analogue electronic network according to claim 10, wherein the first circuit element comprises a first current mirror, comprising a first, diode-connected transistor and a second transistor, the first current mirror being connected to a second current mirror comprising the first output transistor and a third output transistor, the second current mirror being connected to the second output transistor, wherein the first output transistor and the second output transistor are diode-connected.

12. An analogue electronic network according to claim 10, wherein only one of the first and second sets of current mirrors is arranged to be turned on at a time.

13. A method of operating the analogue electronic neural network according to claim 10, wherein the input current and/or the voltage provided by the voltage source are such that the analogue electronic neural network operates in a sub-threshold regime.

14. A network according to claim 10, wherein the control element is implemented using a floating gate or memristive devices.

* * * * *